Nov. 10, 1931.　　C. A. CAMPBELL ET AL　　1,830,927
PUMP GOVERNOR
Filed March 31, 1927
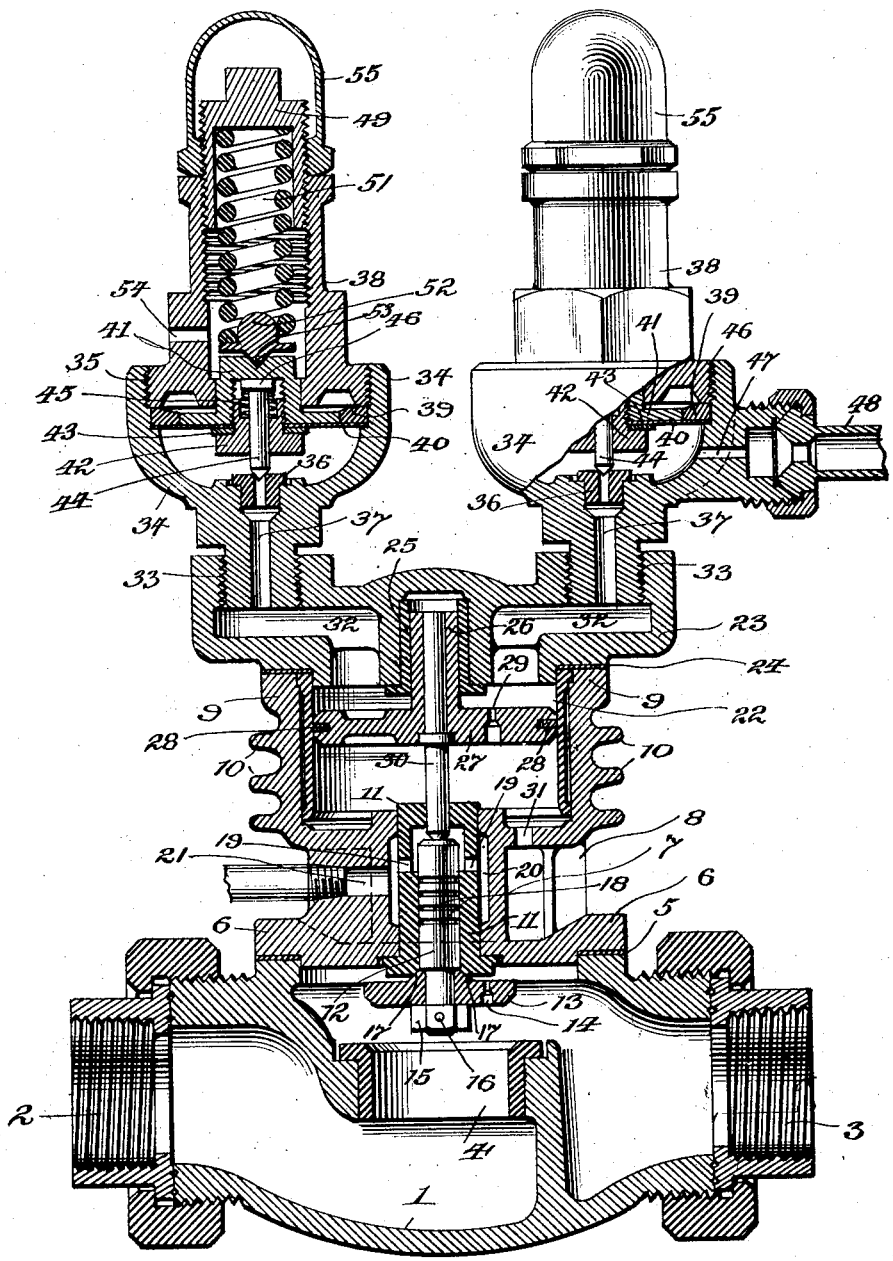
Inventor
Charles A. Campbell
James D. Cartin
By Dodge （signature）
Attorneys.

Patented Nov. 10, 1931

1,830,927

UNITED STATES PATENT OFFICE

CHARLES A. CAMPBELL AND JAMES D. CARTIN, OF WATERTOWN, NEW YORK, ASSIGNORS TO THE NEW YORK AIR BRAKE COMPANY, A CORPORATION OF NEW JERSEY

PUMP GOVERNOR

Application filed March 31, 1927. Serial No. 180,043.

This invention relates to pump governors particularly intended for use in air brake service, and the object of the invention is to provide a device of this character which will operate satisfactorily with superheated steam. Temperatures as high as 700° F. are encountered in this service, and conventional types of pump governors have proven unsatisfactory in action because of malfunctions occasioned by high temperature, one of which is the seizing of the valve stem by the valve stem guide.

Briefly stated, the invention contemplates the construction of those working parts which are necessarily subjected to high temperatures, of such materials as have been found, after investigation, to be free of tendency to seize and bind, and in the isolation, so far as possible, of all other working parts from the high temperatures.

A successful embodiment of the invention is illustrated in the accompanying drawing, which shows, in vertical axial section, a steam pump governor having two governor heads.

In the drawing the steam valve body is indicated by the reference numeral 1 with a steam inlet connection 2 and steam outlet connection 3. The valve seat bushing 4 is mounted in the body 1 with a shrink fit. Bolted to the apertured top face of the body 1 and sealed thereto by a gasket 5 is a cap 6. This carries a relatively slender hub or neck 7 and two or more steadying fins 8 which support a central casting 9 having annular heat radiating ribs 10 on its outer periphery. The neck 7 is bored to receive a bushing 11 composed of rust-proof alloy steel, which also is fixed in place by means of a shrink fit. Slidably mounted in the bushing 11 is a valve stem 12, also composed of the same rust-proof alloy steel. The stem 12 slides freely in an axial direction in the bushing 11 and carries at its lower end a steam valve 13 which in its lower position seats on the seat offered by the bushing 4, and which has the usual by-pass port 14. The valve 13 is mounted on the stem 12 by means of a nut 15 and pin 16. It carries on its upper face a conical valve projection 17, which in the upper position of the valve seats in a corresponding recess formed in bushing 11, the function of which is to prevent leakage around the valve stem in the open position of the valve. The stem is provided with a plurality of sealing grooves 18, and above the uppermost position of these grooves the bushing 11 is provided with vent ports 19 which lead from its interior to an annular chamber 20 formed in the hub 7. Passage 21 vents the annular chamber 20 to atmosphere. Thus any steam leakage around the stem 12 is discharged freely to the atmosphere, and the tendency of such leakage to convey heat to the upper portion of the governor is thus minimized.

The cylinder 9 is provided with a bushing 22. This is held in position and the upper end of the cylinder space is closed by a cap member 23 which seats on a gasket 24. Cap member 23 is provided with a central recess which receives a guide bushing 25 in which freely slides the hub extension 26 formed integrally with the piston 27. This extension and guide thus act as a dash-pot to restrain sudden erratic motions of the piston 27. The piston 27 has the usual sealing piston ring 28 and bleed port 29, and carries a rod 30 which is fixed in the piston and in the hub extension 26 and which extends through an opening in the upper end of the bushing 11 so as to enter into thrust engagement with the upper end of the valve stem 12. The rod 30 is small in diameter and is reduced at its lower end so as to minimize the area of contact between the rod and the valve stem 12. This tends to reduce heat conduction through the stem 12 and rod 30. The use of rods of two different diameters reduces the tendency for leakage to follow along the rods. The space below the piston 27 is vented freely to the atmosphere by the port 31, and the expansion of the air through the port 29 serves to absorb heat within the space below the piston 27 and thus further reduce the transfer of heat.

The cap member 23 is formed with two ports 32 each leading to a corresponding threaded opening 33 in which is threaded the base casting 34 of the corresponding governor head. This casting is open at the top and there threaded, as indicated at 35, and is provided with a valve seat bushing 36 controlling a port 37 which communicates directly with the port 32. Threaded into the opening 35 is the upper body section 38 which clamps a diaphragm retaining ring 39 and a diaphragm 40 against a shoulder in the base casting 34. An abutment member 41 having a hollow internally threaded upward extension rests on the upper face of the diaphragm and is clamped thereto by a threaded guide member 42 which extends through an aperture in the center of the diaphragm and screws into the threaded recess of the abutment member 41. A tight joint is secured by a washer 43.

Slidably mounted in the guide member 42 is a pin valve 44 which coacts with the valve seat bushing 36. This valve is urged upward by a spring 45 which is confined below the head 46 on valve 44 and which normally holds the pin valve in its uppermost position relatively to the diaphragm 40. Leading from the space below the diaphragm 40 is a port 47 which is connected by pipe 48 with the main reservoir or other volume whose variations of pressure are to control the operation of the pump by opening and closing the valve 13 which controls the supply of steam to the pump.

The upper end of the body 38 is threaded to receive an adjustable spring seat 49 in which is seated the upper end of the governor spring 51. The lower end of this spring reacts against and is centered by a spring seat 52 which has a conical boss 53 seating in a recess in the upper face of the abutment member 41. The vent port 54 maintains the space above the diaphragm 40 at atmospheric pressure. The cap 55 threaded on the projecting end of the spring seat 49 houses this and locks it in its adjusted position.

Some parts illustrated on one of the governor heads in the drawing are not visible on the other governor head, for the reason that the sections have been taken on different planes with respect to the axes of the two heads. This is done to permit a more complete illustration of the details of construction in a single view, and it will be understood that the two governor heads are identical, and are ordinarily adjusted to respond at two different pressures.

The duplex pressure head arrangement conforms to known duplex governor practice in the air brake art, and a detailed discussion of this arrangement is unnecessary.

If both pin valves 44 are closed pressure above the piston 27 bleeds away through the port 29 and the valve 13 is opened by the steam pressure acting beneath it. When pressure below either of the diaphragms 40 rises sufficiently to overpower its spring 45 corresponding pin valve 44 will be unseated and air will flow by way of the passages 37 and 32 to the space above the piston 27. If this flow occurs at a rate greater than the capacity of port 29 the piston 27 will be forced downward closing the valve 13. While the valve 13 is held closed there will be a slow flow of air through the port 29 to the chamber beneath piston 27 which tends to cool this chamber. In certain positions of the pin valves 44 the flow through the port 37 may so approximate the capacity of the port 29 that the piston 27 will assume an intermediate position in which the valve 13 is partly but not completely closed. In controlling the action of the piston 27 in such intermediate position, the extension 26 and bushing 25 coact to produce a dash-pot action and thus restrain sudden movement of the piston 27. This dash-pot effect permits the elimination of the spring customarily used to urge the piston upward. The presence of the spring is undesirable, but it has hitherto been found essential to smooth operation of air pump governors. The dash-pot action is, therefore, an important feature of the invention.

In order to permit the governor to function smoothly in this progressive manner, it is essential that the piston 27 move freely in its bushing 22, and that the valve stem 12 move freely in its bushing 11. The use of rust-proof steel for the parts 11 and 12, has been found to afford smooth action regardless of temperature variations. The separation of the stems 30 and 12, and the provision of the relatively long neck 7 and spaced separating fins 8 so retards the transfer of heat that the piston 27 and bushing 22 are never so heated that they fail to function satisfactorily. The provision of the vent spaces 20 and 21 to carry off any steam leakage from the upper end of the valve stem 12 also reduces any tendency for heat to be carried by convection to the space below the piston 27. It has been found in actual practice that with temperatures in the neighborhood of 700° F., which is so high as to burn paint off the body 1 of the valve, the cylinder 9 is not heated to a very high temperature and the hand may safely be placed on the cap structure 23, a fact which clearly demonstrates the effective isolation of the cylinder 9 from the valve body 1.

Various changes of detail are obviously possible and no limitation to the specific structure illustrated is implied. It is common practice in this art to use one or more governor heads in a single pump governor structure, and the number and form of the governor heads is immaterial to the present invention. The piston 27 and its cylinder are typical of known types of pressure actuated motor. The port 29 is in effect merely a restricted by-pass from one side of the piston to the other, and its exact location is immaterial.

What is claimed is,—

1. In a pump governor, the combination of a steam valve body; a valve therein; a pressure motor for actuating said valve; a support for said motor carried by said body, and comprising a slender elongated neck through which the operative connection between motor and valve passes; and slender heat radiating fins, said fins being spaced from said neck and serving as an additional steadying connection between said motor and said valve body.

2. In a pump governor, the combination of a steam valve body; a valve therein having a stem; a pressure motor cylinder; a support for said cylinder carried by said body and comprising a slender elongated neck; a guide for said valve stem mounted in said neck; means serving to intercept steam flowing between said stem and guide and discharge it to the atmosphere; and a piston in said cylinder in thrust relation with said stem.

3. In a pump governor, the combination of a steam valve body; a valve therein having a stem; a pressure motor cylinder having an air vent port; a support for said cylinder located adjacent said air vent port and including a slender elongated neck having a steam vent port; a guide bushing for said valve stem arranged to form a steam venting passage which leads through and around the bushing within the neck and thence through said steam vent port to atmosphere; a piston in said cylinder in thrust relation with said stem, there being a restricted by-pass from one side of the piston to the other; and pressure responsive means for admitting air against the side of said piston remote from said air vent port at a rate which at times exceeds the capacity of said by-pass.

4. In a pump governor, the combination of a steam valve body; a valve therein having a stem; a compressed air motor including a cylinder and piston with a vent arranged to discharge motive compressed air in cooling relation with said cylinder; a sustaining connection between said cylinder and body comprising a narrow neck in which said stem is guided; a thrust member carried by said piston and arranged to enter into thrust relation over a small area with said stem; and pressure responsive means for admitting air to act against said piston at a rate which at times exceeds the capacity of said motor vent.

5. In a pump governor, the combination of a steam valve body; a valve therein having a stem; a compressed air motor including a cylinder and piston with a vent arranged to discharge motive compressed air in cooling relation with said cylinder; a sustaining connection between said cylinder and body comprising a narrow neck in which said stem is guided, said neck having a chamber vented to atmosphere; a thrust member carried by said piston and arranged to enter into thrust relation over a small area with said stem within the vented chamber in said neck; and pressure responsive means for admitting air to act against said piston at a rate which at times exceeds the capacity of said motor vent.

6. In a pump governor, the combination of a steam valve body; a valve therein having a stem; a compressed air motor including a cylinder and piston with a vent arranged to discharge motive compressed air in cooling relation with said cylinder; a stem connected with said motor piston, of different diameter from the valve stem and in thrust engagement therewith; a sustaining connection between said cylinder and body comprising a narrow neck in which both said stems are guided and with which each fits closely to resist fluid flow between stem and guide, the guide having means for venting to the atmosphere pressure fluid which may penetrate to the point of thrust engagement between stems; and pressure responsive means for admitting air to act against said piston at a rate which at times exceeds the capacity of said motor vent.

7. The combination of a valve body; a valve therein having a stem; a cylinder having a dash-pot formed in one end thereof; a piston in said cylinder having an integral hub extension working in said dash-pot; a stem fixed in said hub and piston and in thrust relation with said valve stem; and pressure responsive means arranged to vary gradually the effective pressure on said piston.

8. In a pump governor, the combination of a steam valve body; a valve therein having a stem; a cylinder having a dash-pot formed in one end thereof; a piston in said cylinder having an integral hub extension working in said dash-pot; a stem fixed in said piston and in thrust relation with said valve stem; a slender connection between said cylinder and valve body; guiding means in said connection sustaining said stems adjacent their point of engagement, and arranged to retard flow of steam to such point and to vent any leakage to atmosphere; and pressure responsive means arranged to vary the effective pressure on said piston.

9. The combination of a valve body; a valve therein having a stem; a guide for said stem; means in said guide serving to intercept leakage flowing between said guide and stem and discharge it to atmosphere; a pressure motor spaced from said valve body, having an air vent port, and arranged to actuate said valve through said stem; pressure responsive means for admitting pressure fluid to said motor at varying rates; and means for directing pressure fluid discharged by said vent port into the space between said motor and valve body and into contact with said guide.

10. The combination of a valve body; a valve therein having a stem; a guide for said stem; means in said guide serving to intercept leakage flowing between said guide and stem and discharge it to atmosphere; a pressure motor spaced from said valve body, having an air vent port, and arranged to actuate said valve through said stem; pressure responsive means for admitting pressure fluid to said motor at varying rates; means for directing pressure fluid discharged by said vent port into the space between said motor and valve body and into contact with said guide; and a heat radiating supporting connection in said space between said motor and valve body.

11. The combination of a steam valve; a fluid pressure motor spaced therefrom and arranged to actuate the same, said motor having a constantly open vent port which discharges into the space between said valve and motor; a heat radiating connecting structure between said valve and motor arranged to be cooled by pressure fluid discharged through said vent port; and pressure responsive means for admitting pressure fluid at varying rates to said motor.

12. In a compressor governor, the combination of a steam valve body having a valve chamber and a seat, and having an opening above said seat; a member comprising in one piece a bonnet for closing the opening in the top of said valve body, a motor cylinder, and relatively slender connecting means between said bonnet and motor cylinder serving to space them apart; a valve coacting with the seat in said body and having a stem guided in said bonnet; a piston working in said motor cylinder and operatively related to said valve; a removable cylinder head for said motor cylinder; and regulating valve means mounted directly on said cylinder head and removable therewith.

13. In a compressor governor, the combination of a steam valve body having a valve seat and an opening above said seat; a member comprising in one piece a bonnet for closing said opening in the valve body, a motor body and a relatively slender connecting portion serving to space said bonnet from said motor body; a valve coacting with the seat in said valve body and having a stem guided in said bonnet; a removable cylinder bushing having a flange seated in a recess in said motor body; a removable head for said motor body, serving to retain said bushing in position; a piston working in said bushing and operatively related to said valve; and valve mechanism mounted on said head and removable therewith, said valve mechanism serving to control the fluid pressure acting upon said piston.

In testimony whereof we have signed our names to this specification.

CHARLES A. CAMPBELL.
J. D. CARTIN.

CERTIFICATE OF CORRECTION.

Patent No. 1,830,927. Granted November 10, 1931, to

CHARLES A. CAMPBELL ET AL.

It is hereby certified that error appears in the printed specification of the above numbered patent requiring correction as follows: Page 3, line 128, claim 9, and page 4, line 12, claim 10, for "into" read in; and that the said Letters Patent should be read with these corrections therein that the same may conform to the record of the case in the Patent Office.

Signed and sealed this 2nd day of February, A. D. 1932.

(Seal)

M. J. Moore,
Acting Commissioner of Patents.